INVENTOR.
JOSEPH F. HALL JR.

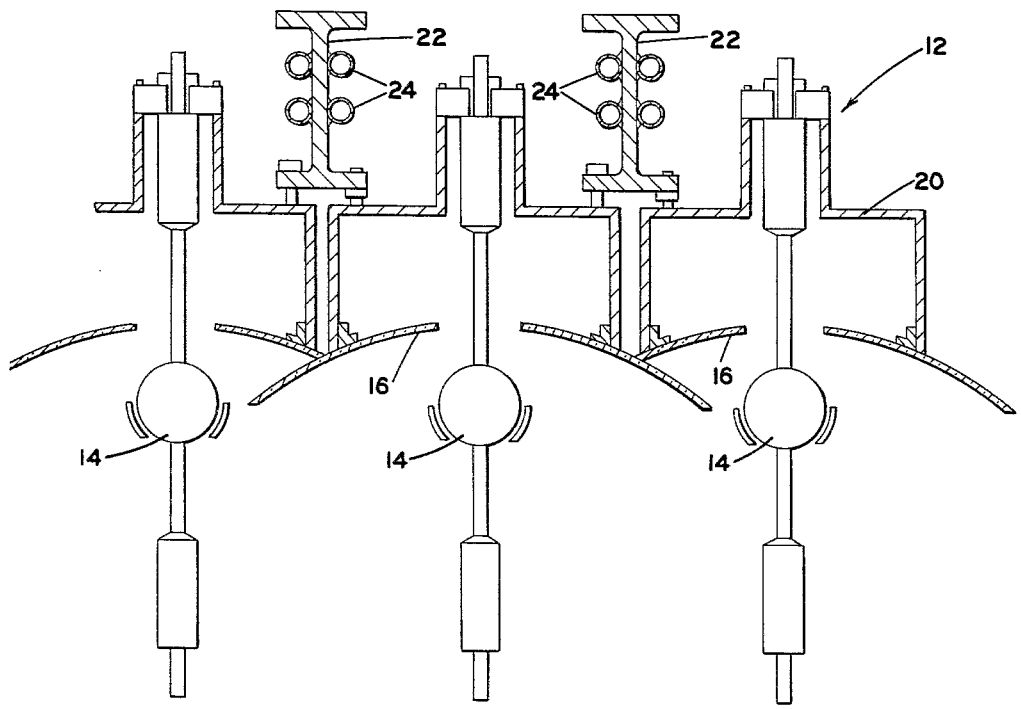
FIG. 2
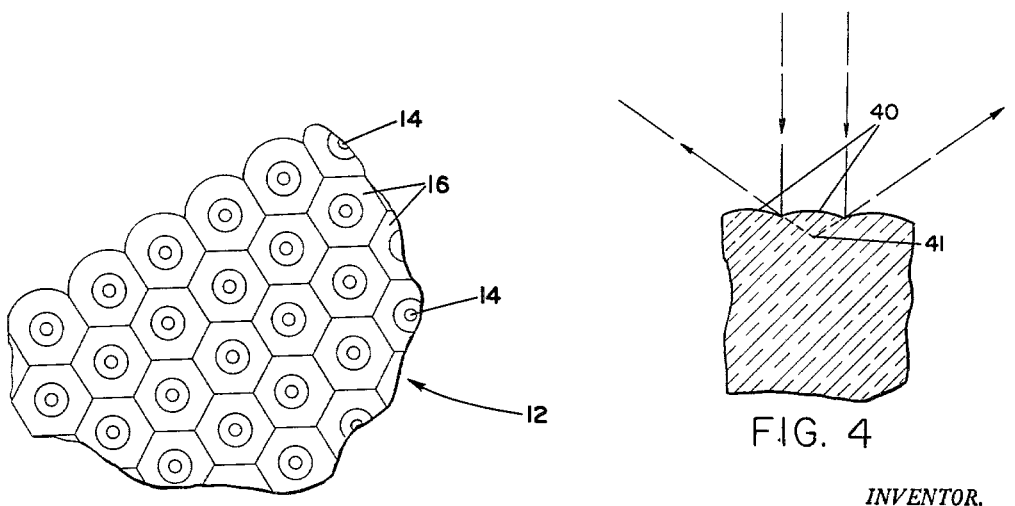
FIG. 3
FIG. 4
INVENTOR.
JOSEPH F. HALL JR.
ATTORNEYS

United States Patent Office 3,239,660
Patented Mar. 8, 1966

3,239,660
ILLUMINATION SYSTEM INCLUDING A VIRTUAL
LIGHT SOURCE
Joseph F. Hall, Jr., Rochester, N.Y., granted to National Aeronautics and Space Administration under the provisions of 42 U.S.C. 2457(d)
Filed Jan. 31, 1961, Ser. No. 86,018
8 Claims. (Cl. 240—41.36)

This invention relates to a novel illumination system including plural, spaced light sources and means for combining their outputs to form a single virtual source.

Illumination systems of the type in which it is desired to vary the intensity of illumination without varying its color, or the spectral distribution of the energy content have heretofore depended largely upon variable stops or neutral density optical wedges for controlling the intensity of the illumination. These systems necessarily involves a loss of efficency as the illumination is attenuated, and are not economically useful in systems capable of producing relatively high intensity illumination such as, for example, sun simulator systems.

In a sun simulator system, it is desirable to provide means for varying the intensity of illumination over a relatively wide range without change in the spectral distribution of the illumination, so that the simulator may be used to simulate not only sunlight, but also earthlight and moonlight. In order to provide sufficient illumination to simulate sunlight over a practicably large area, it is necessary to employ plural light sources, and it is desirable to control the intensity of illumination by varying the number of the light sources that are energized, thereby avoiding changes in the spectral distribution of the light output of the simulator, and maintaining a relatively high degree of efficiency. It is also desirable to avoid localized field darkening effects caused by the selective extinguishment of the individual light sources, and to maintain uniformity of illumination over the entire field toward which the illuminator is directed.

Accordingly, one important object of the present invention is to provide a novel illumination system including means for combining the outputs of plural light sources to form a single virtual source, the intensity of which varies in accordance with the number of individual real sources that are selectively energized at any one time.

Other objects are: to provide a novel illumination system particularly suitable for use as a sun simulator in conjunction with an environmental test chamber; to provide a novel illumination system of this type in which the real light sources may be positioned exteriorly of the test chamber and their light outputs directed into the test chamber through a relatively small window; to provide a novel illumination system of this type including means for producing a virtual source within the chamber, the intensity of which is proportional to the total number of the real sources that are energized at any given time; and in general, to provide an illumination system of this type which is of relatively simple and rugged construction, and reliable and convenient in operation.

The foregoing and other objects and advantages of the invention will become apparent in the following detailed description of a representative embodiment thereof, taken in conjunction with the drawings, wherein FIG. 1 is a partly schematic, vertical sectional view of a sun simulator according to the present invention;

FIG. 2 is a partly schematic, vertical sectional view on an enlarged scale of the array of light sources included in the sun simulator shown in FIG. 1;

FIG. 3 is a fragmentary bottom view of the array of light sources, and

FIG. 4 is an enlarged cross section view of the plurality of hyperboloids of revolution.

Figure 1:
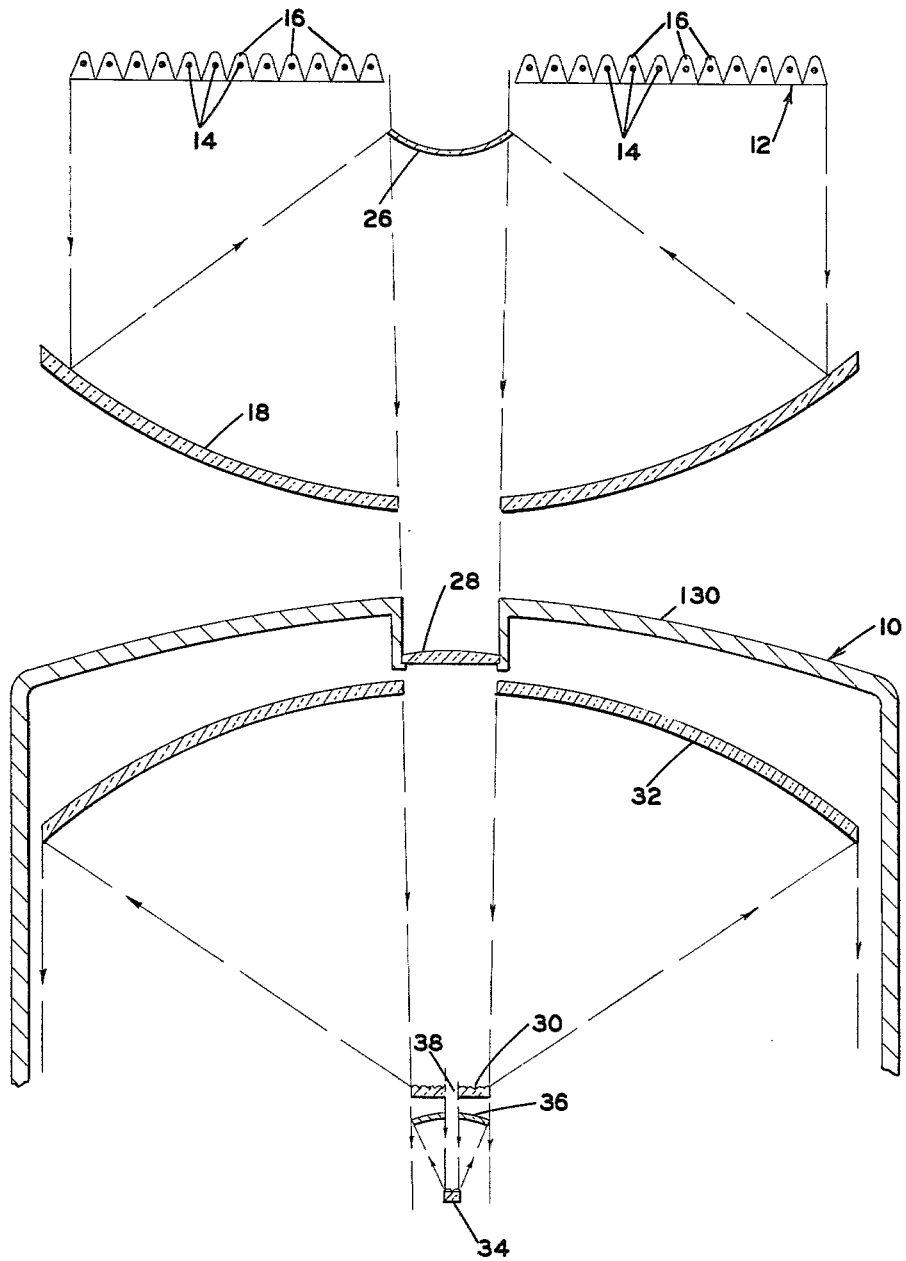

Briefly, an illumination system according to the present invention comprises an array of real light sources, means for directing light from all of the sources into a common, relatively confined path toward a multi-faceted reflector, which will be described in greater detail hereinafter, and which serves as a virtual source. The reflector distributes the light received from the real sources over a relatively wide angle, and directs it toward a collimating reflector, thereby illuminating the desired field. The intensity of illumination from the virtual source constituted by the multi-faceted reflector is directly proportional to the number of real sources that are energized at any given time. Because of the nature of the multi-faceted reflector and the manner in which it distributes light impinging upon it, the field is always relatively uniformly illuminated regardless of which ones of the real sources are energized or de-energized.

The present invention was developed in connection with a sun simulator system for use with an outer space environmental test chamber, and is believed to be especially advantageous for such application. It is also expected, however, that the invention will find advantageous application in other cases where similar design requirements are to be considered.

Referring now to the drawings, an illumination system according to a presently preferred embodiment of the invention is illustrated in FIG. 1 arranged as a sun simulator for illuminating the interior of an outer space environmental test chamber 10, in which an object such as a space satellite may be placed for test purposes. The illumination system of the invention includes an array 12 of real light sources 14, which are preferably xenon or mercury-xenon high pressure arc lamps, because the light output of such lamps relatively closely approximates sunlight with respect to its spectral distribution.

Any desired means (not shown) are provided for selectively energizing different ones of the lamps 14. The lamps 14 are arranged in a disc-like array, and individual parabolic reflectors 16 are positioned behind the respective lamps 14 for directing light from the lamps generally downwardly toward a single, upwardly concave parabolic reflector 18. The lamps 14, and the reflectors 16 are mounted on a framework generally designated 20, which is supported on a plurality of I-beams 22. In those cases where relatively large power outputs are required, as in the present sun simulator, the I-beams 22 are preferably cooled by a liquid circulated through pipes 24 arranged in thermal contact with the I-beams 22.

The concave reflector 18 converges the light from the individual light sources 14, and directs it toward a relatively small diameter, convex, hyperbolic mirror 26, which is located at the center of the array 12, facing downwardly. The relative curvatures of the concave reflector 18 and the convex mirror 26 are chosen so that the light coming downwardly from the convex mirror 26 is substantially collimated.

A window 28 in the form of a lens is mounted in the cover 130, of the chamber 10, and the collimated light from the convex mirror 26 passes through the window 28. The optical power of the window 28 is selected to image the convex reflector mirror 26 upon the multi-faceted reflector 30, which is fixed within the chamber 10 directly beneath the window 28 and optically aligned with the window 28 and the convex reflector 26. Thus, the array 12 is imaged on the multi-faceted reflector 30, which becomes a virtual light source within the test chamber 10.

The parabolic reflector receives a collimated light from the plurality of light sources 14 and reflectors 16 associated with said sources. The hyperbolic reflector 26 bares a relationship to the parabolic reflector 18 such that when the virtual focus of the hyperbolic reflector and the focal point of the parabolic reflector are coincidental, the light reflected from the hyperbolic reflector 26 is substantially collimated. This relationship is a characteristic of these two types of reflectors in the combination as illustrated. It is of course necessary that the proper reflectors be selected to provide a collimation as indicated.

The light reflected from the hyperbolic reflector 26 is however slightly convergent as it is reflected from the reflector. This is due to the fact that the parabolic focal point is intermediate the parabolic reflector 18 and the virtual focal point of the hyperbolic reflector 26. The distance between the two focal points controls the convergence of the rays reflected from the hyperbolic reflector 26. It is necessary however that the central axis of both the reflectors 18 and 26 be coincidental.

The multi-faceted reflector 30 is a highly reflective surface preferably in the form of a close packed array of convex hyperboloids of revolution. It distributes the light received by it, causing the light to diverge upwardly toward a downwardly directly parabolic reflector 32. The multi-faceted reflector 30 serves to "scramble" the image of the array 12. Each hyperbolic portion of the reflector 30 illuminates substantially the entire surface of the downwardly facing parabolic reflector 32, so that even in the event that only one randomly selected light source 14 is energized, and only a relatively small portion of the multi-faceted reflector is illuminated, the entire surface of the downwardly facing reflector 32 will be relatively uniformly illuminated.

The reflectors 30 and 34 are axially coincidental with the parabolic reflector 32 and the hyperbolic reflector 26. Each of the reflectors 30 and 34 are formed by a reflecting plurality surface 40 simulating hyperboloids of revolution having a characteristic of reflecting light with a uniform illumination over the surface of the parabolic reflector 32 and 36 respectively. The surfaces form a virtual source 41 as indicated. The hyperbolic surfaces of reflector 34 however reflect against the hyperbolic reflector 36.

In relatively large systems such as the system for which the herein described embodiment of the invention was developed, it may be desirable to provide an auxiliary multi-faceted reflector 34, and a corresponding parabolic reflector 36 to fill in the shadow cast by the first multi-faceted reflector 30. For example, when the main downwardly facing parabolic reflector 32 is about twenty-five feet in diameter, the main multi-faceted reflector 30 may be about thirty inches in diameter, and thus cast an appreciable shadow within the chamber. In order to minimize the shadow, the main multi-faceted reflector 30 may have a control aperture 38 permitting a relatively small portion of the light to pass through the main multi-faceted reflector 30 and fall upon an auxiliary, relatively small diameter multi-faceted reflector 34. The auxiliary reflector 34 then directs the light received by it upwardly to an auxiliary parabolic reflector 36 in an exactly similar manner as the main multi-faceted reflector 30.

The multi-faceted reflectors 30 and 34 may take any desired form. Preferably, for maximum efficiency their working surfaces are highly reflective over the entire spectral range of the illuminating system, so that they will absorb a minimum proportion of the energy impinging upon them. They may be relatively finely textured, provided they achieve adequate scattering of the collimated light impinging upon them, or they may be, for example, of a relatively coarse, nodular texture as in the hyperboloidal array described hereinabove. Each nodule, or curved facet is preferably no larger than the size of the image of a single one of the real light sources 14 formed on the reflector.

In relatively large devices of this character, the parabolic reflectors 18 and 32 are preferably made in sectional form for convenience in manufacture and assembly. Generally, glass or metal is a preferred base material for these reflectors, and relatively large, accurately curved glass or metal surfaces such as those exceeding about ten feet in diameter are not readily available. These and other variations in details of construction will be well within the skill of those familiar with the art.

What is claimed is:

1. A light source for use in conjunction with an environment test chamber comprising an array of real light sources, means defining a test chamber, said array disposed outside of the chamber, a light converging reflector intermediate said chamber and said array, reflectors individually associated with each one of said real light sources directing light in a common direction toward the chamber and said reflector, a divergent reflector positioned adjacent to said array receiving light from said convergent reflector and directing collimating light so received toward the chamber, a reflector composed of a close packed array of curved surfaces positioned within the chamber facing said divergent reflector forming a plurality of virtual light sources within the chamber, a lens constituting a window in the chamber wall imaging said divergent surfaces of said reflector upon said close packed reflector, a second light converging reflector mounted within said chamber receiving light from said close packed surfaces on said reflector and collimating light so received within the test chamber.

2. An illumination system for use in conjunction with an environmental testing chamber comprising an array of real light sources, means defining a test chamber, said array disposed outside of the chamber, reflectors individually associated with each one of said real light sources directing light in a common direction toward the chamber, a concave parabolic reflector mounted adjacent to said chamber facing said array, a convex hyperbolic reflector centrally mounted adjacent to said array facing said parabolic reflector, the curvatures of said parabolic and hyperbolic reflectors being selected to produce a substantially collimated beam of light from said hyperbolic reflector, a multi-faceted reflector composed of a close-packed array of convex hyperboloidal surfaces positioned within the chamber facing said hyperbolic reflector, lens means in the wall of the chamber imaging said hyperbolic reflector upon said close-packed array reflector, each one of said hyperboloidal surfaces being no larger than the size of an image formed thereat of one of said real light sources by said parabolic reflector, said hyperbolic reflector, and said lens means, and a second hyperbolic reflector mounted within the chamber collecting and collimating light reflected from said close-packed array reflector.

3. An illuminating system comprising a plurality of light sources including means radiating a substantially collimated luminous flux, a multi-faceted reflector including a plurality of surfaces of revolution constructed and arranged with their axes of rotation in parallel relationship relative to each other, reflector means receiving the luminous flux from said plurality of light sources and directing the luminous flux on said multi-faceted reflector, light directing means receiving uniform light from said multi-faceted reflector in response to the illumination of any of said facets in said multi-faceted reflector and directing uniform illumination over a predetermined area.

4. A sun simulator comprising an array of light sources radiating collimated light each having a light output simulating the spectral output of sunlight, a reflector comprising a close packed array of hyperbolic reflecting surfaces having axes in parallel relationship, said reflector constructed and arranged in a manner forming a plurality of virtual light sources providing illumination of an intensity proportional to the number of light sources energizing and with a special distribution which remains substantially constant despite variations of its intensity due to changes in the number of said light sources that are energized, a light converging optical system directing light from said plurality of sources to said reflector, a collimator receiving light from said reflector and directing collimated light over a predetermined area.

5. An illuminating system comprising a plurality of light sources radiating a substantially collimated luminous flux, a reflector defining at least a portion of a surface of a hyperboloid of revolution, any portions of surfaces of revolution having axes arranged in parallel relationship, an optical system intermediate said plurality of light sources and said reflector constructed and arranged for increasing the intensity of the luminous flux directed on said reflector, light gathering means receiving light from said reflector and projecting a luminous flux of decreased intensity in a substantially collimated manner.

6. An illuminating system comprising a plurality of light sources radiating a substantially collimated flux, a multi-faceted reflector, said facets defining hyperboloids of revolution having parallel axes and forming virtual image sources reflecting light equally in all directions about an axis of the hyperboloid of revolution, an optical system intermediate said sources and said facets receiving the luminous flux from said sources and focusing the luminous flux on said facets, a collimator receiving light from said facets of said multi-faceted reflector and projecting a uniform illumination.

7. An illuminator system comprising an array of real light sources aligned in parallel relationship and radiating a substantially collimated luminous flux, a multi-faceted reflector incuding a plurality of surfaces of revolution axially in parallel alignment relative to each other, an optical system intermediate said sources and said facets imaging said array of light sources upon said facets, a parabolic collimator means receiving light from said plurality of facets constructed and arranged to project uniformity of illumination from said collimator of an intensity proportional to the number of light sources energized.

8. An illuminating system comprising an array of real light sources, a parabolic light reflector associated with each of said light sources reflecting a substantially collimated luminous flux, a multi-faceted reflector including a plurality of facets defining at least a portion of a paraboloid of revolution having parallel axes with each of said facets forming a virtual source no larger than the size of said sources, an optical system including parabolic reflectors imaging said array of light sources on said multi-faceted reflector, a parabolic collimator receiving uniform illumination from each of said plurality of facets of said reflector and reflecting a substantially collimated luminous flux of the intensity proportional to the number of light sources energized.

References Cited by the Examiner
UNITED STATES PATENTS

| | | | |
|---|---|---|---|
| 1,267,884 | 5/1918 | McKeever | 240—41.36 |
| 1,987,357 | 1/1935 | Wahlberg | 240—41.6 X |
| 2,263,727 | 11/1941 | Gensburg | 240—41.35 |
| 2,286,448 | 6/1942 | Wahlberg | 240—41.6 X |
| 2,710,336 | 6/1955 | Jorn | 240—47 X |
| 2,744,209 | 5/1956 | Ferguson | 240—46.49 |
| 2,755,374 | 7/1956 | Ott et al. | 240—41.1 X |
| 2,787,701 | 4/1957 | Rosin | 240—41.1 |

FOREIGN PATENTS

| | | |
|---|---|---|
| 128,240 | 6/1919 | Great Britain. |
| 832,378 | 4/1960 | Great Britain. |

NORTON ANSHER, *Primary Examiner.*

GEORGE A. NINAS, JR., EMIL G. ANDERSON, SAMUEL FEINBERG, *Examiners.*